United States Patent [19]

Johnson

[11] 4,423,936
[45] Jan. 3, 1984

[54] PHOTOGRAPHIC EXPOSURE CONTROL SYSTEM AND METHOD

[75] Inventor: Bruce K. Johnson, Andover, Mass.

[73] Assignee: Polaroid Corporation, Cambridge, Mass.

[21] Appl. No.: 402,149

[22] Filed: Jul. 26, 1982

[51] Int. Cl.³ .................. G03B 3/10; G03B 7/093; G03B 15/05
[52] U.S. Cl. .................. 354/403; 354/415; 354/432; 354/456; 354/482
[58] Field of Search .............. 354/25 R, 25 A, 25 P, 354/25 N, 27, 31, 32-35, 60 R, 139, 145, 149, 195, 31 F, 50, 51, 49

[56] References Cited

U.S. PATENT DOCUMENTS

| | | | |
|---|---|---|---|
| 4,065,778 | 12/1977 | Harvey | 354/25 |
| 4,199,246 | 4/1980 | Muggli | 354/195 |
| 4,214,826 | 7/1980 | Uchida et al. | 354/31 |
| 4,230,400 | 10/1980 | Wick et al. | 354/25 |
| 4,285,583 | 8/1981 | Canter | 354/31 X |
| 4,285,584 | 8/1981 | Canter | 354/31 |
| 4,298,258 | 11/1981 | Matsuda | 354/25 |
| 4,306,787 | 12/1981 | Fukuhara | 354/31 |
| 4,309,090 | 1/1982 | Yamada | 354/31 |
| 4,309,091 | 1/1982 | Fukuhara et al. | 354/31 |
| 4,313,654 | 2/1982 | Matsui et al. | 354/25 |

Primary Examiner—William B. Perkey
Attorney, Agent, or Firm—John S. Vale

[57] ABSTRACT

A photographic exposure control system automatically classifies ambient scene lighting conditions as normal, backlit or forelit and then selects an exposure parameter signal program that is appropriate for the indicated conditions. The system monitors a plurality of different portions of the scene area with a multi-sensor array that detects both subject range and ambient light intensity. A comparison of range measurements identifies that scene area portion having the nearest subject therein as the subject area. Ambient light intensity measurements of subject and non-subject areas are compared to classify lighting conditions and select a corresponding one of normal, backlit and forelit signal programs which control operation of system components to vary the ratio of ambient to artificial light contribution to exposure for the indicated lighting conditions.

28 Claims, 6 Drawing Figures

PHOTOGRAPHIC EXPOSURE CONTROL SYSTEM AND METHOD

BACKGROUND OF THE INVENTION

The present invention relates to the field of photography and, more specifically, to photographic exposure control systems.

Over the past few years, there have been dramatic advances in the state of the art of automatic exposure control systems employed in cameras designed for the mass amateur market.

Earlier so-called "automatic" cameras generally operated in an automatic exposure mode only for ambient light exposures, during which the proper aperture or shutter speed was set in accordance with a scene light level measurement provided by a light integrating circuit formed in part by a photocell, and flash mode operation generally required the manual setting of an aperture correlated to camera to subject distance. The development of variable output "quench" strobe units, fast response photosensitive light detectors, such as silicon photo diodes, and high speed logic circuits, eventually led to systems that also automatically controlled flash exposures.

Contemporary automatic exposure control systems, employing low-cost integrated logic circuits and microprocessors, are highly sophisticated and may include such added features as automatic ranging and lens focusing, and a fill flash capability providing automatic control over the ratio of ambient to flash contribution to exposure.

Most automatic exposure control systems have certain common operating characteristics in that they utilize input data, such as film speed, the brightness level of ambient light reflected from the scene, and camera to subject distance to derive a logic program for controlling the sequential operation of camera components such as a lens focusing mechanism, the shutter and/or aperture setting device, and the flash unit. Some of the input data, such as film speed, subject range, and scene brightness level may be entered into the system before initiation of the exposure interval while other inputs such as the time integrated brightness level of light emanating from the scene may be entered into the system during the exposure interval to provide a feedback control employed to quench the strobe and/or provide a command signal to close the shutter.

Various automatic exposure control systems differ in the manner in which they acquire pre-exposure input data. Some systems are passive in that they may simply energize their light detecting circuits to sense the scene light level. Other systems are active in that they send out a pre-exposure signal which is reflected back by objects in the scene and detected to provide range information. Generally, the emitted signal differs in frequency or some other characteristics to distinguish it from image forming scene light. For example, commonly assigned U.S. Pat. No. 4,199,246 discloses an automatic ranging and focusing system that employs ultrasonic signals for determining subject range. Also, see commonly assigned U.S. Pat. No. 3,583,299 which emits a short flash of light from a light source prior to exposure for determining the reflective characteristics of the scene, and U.S. Pat. Nos. 4,230,400 and 4,313,654 along with commonly assigned copending application U.S. Ser. No. 193,891 filed on Oct. 6, 1980 which disclose systems that emit radiation in the infrared frequency range for ranging purposes.

In general, these sophisticated automatic exposure control systems produce excellent photographic results provided that the scene lighting conditions are what can be called "normal". The term "normal", as used herein, means that there is a fairly well balanced distribution of light intensity over the entire scene area. This is in contrast to a backlit scene where the illumination level of the subject of principal interest is much lower than the illumination level of the background, or a forelit scene where the subject is illuminated at a much higher level than the background.

One common picture taking situation that exhibits backlighting is when the sun is in the background behind the subject. In some instances, automatic exposure control systems will set exposure for the higher background illumination thus underexposing the subject of principal interest.

A forelit scene may occur where the subject is brightly illuminated by sunlight, or a spotlight, while the areas around the subject exhibit subdued illumination because of shadows or a dark colored light absorbing background. In this instance the automatic exposure control system may properly expose the principal subject provided that the photocell reading is taken from that portion of the scene but the background will be underexposed. But if the metering system is configured to take an average brightness reading, or the subject is not located in the center of the scene and the system is configured for a center weighted average reading, then the subject may either be over or under exposed.

There are several exposure control systems known in the prior art that have attempted to deal with this problem. For example, see U.S. Pat. Nos. 4,188,104; 4,214,826; 4,285,583; 4,285,584; 4,306,787; 4,309,090; and 4,309,091 which employ multi-element arrays of photosensitive devices to separately measure the ambient brightness level in each of a plurality of different areas of the scene. By analyzing the distribution of illumination levels the system provides a logic signal classifying scene lighting conditions and automatically set exposure parameters accordingly. One limitation of some of these systems is that they compare the light level reading of the center portion of the scene with readings from the sides and top and bottom of the scene based on the assumption that the subject of principal interest will be centered in the viewfinder. In many instances the assumption will be valid. However, many times it will not be valid in that the subject of principal interest may well be located about the periphery of the scene boundary. In this instance an erroneous conclusion will be reached by the logic as to the classification of scene lighting conditions and more likely than not the subject of principal interest will be either over or under exposed.

Therefore, it is an object of the present invention to provide a photographic exposure control system which is operative to automatically locate the subject of principal interest within the scene area before applying a comparative analysis of light levels in different parts of the scene to classify scene lighting conditions as normal, backlit, or forelit.

It is another object of the invention to provide such an exposure control system which emits a pre-exposure signal and detects reflected back portions thereof to identify the location of the subject of principle interest within the total scene area.

Yet another object of the invention is to employ such an emitted signal as a ranging signal.

Another object of the invention is to provide such an exposure control system that further includes a variable output source of artificial illumination and utilizes the classification of scene lighting conditions to adjust the ratio of ambient to flash contribution to exposure in accordance therewith, thereby providing different types of exposure programs for each of the different classifications of scene lighting conditions.

Other objects of the invention will, in part, be obvious and will, in part, appear hereinafter.

SUMMARY OF THE INVENTION

The present invention provides a photographic exposure control system for initially classifying ambient scene lighting conditions as normal, backlit or forelit and, thereafter, automatically selecting appropriate exposure parameters for the indicated conditions.

The system comprises means, including a shutter arrangement, responsive to exposure parameter signals for controlling transmission of scene light to a photosensitive recording medium during an exposure interval; means, operative during a pre-exposure interval, for emitting ranging signals toward the scene, separately measuring the intensity of reflected back portions of these ranging signals from a plurality of selected different scene area portions, and providing a signal identifying the scene area portion having the nearest subject therein to designate it as the subject area, and means, operative during the pre-exposure interval or during an initial portion of the exposure interval, for separately measuring the ambient light intensity in each of the selected different scene area portions and providing corresponding separate area intensity signals for each different portion.

The system also includes means responsive to the subject area identifying signal and the area intensity signals for comparing the subject area ambient intensity with the ambient intensity of non-subject areas and, as a result of the comparison, providing a signal classifying ambient scene lighting conditions as normal, backlit, or forelit. Means are also provided for storing normal, backlit and forelit exposure parameter signal programs, and responding to the classifying signal for selecting the appropriate one of these programs corresponding to the classifying signal and transmitting the selected program of signals to the means for controlling transmission of scene light to the recording medium.

In a preferred embodiment the exposure control system is configured for ambient, flash, and fill-flash operation. The source of artificial illumination for both flash and fill-flash mode of operation is preferably a variable output quenchable strobe unit.

The means for emitting the ranging signal toward the scene preferably also forms part of an automatic ranging and lens focusing system. There are several different ways of providing the ranging signal. In one embodiment the strobe unit is fired during the pre-exposure interval to direct a low energy pulse of light towards the scene area. In another embodiment a burst of energy in the infrared frequency range is directed towards the scene from an infrared emitting LED.

In the illustrated embodiment both the reflected back portions of the ranging signals and the reflected ambient light from the scene are measured by an array of three photocell detectors that monitor three corresponding different adjacent portions of the total scene area. The subject of principal interest is designated as any major subject closest to the camera. Thus, the locating signals or ranging signals reflected back from the closest subject will be detected as having the highest intensity. The photocell that receives the highest reflected intensity during ranging operations therefore is automatically designated by the system as covering the subject area. In this manner, one (or more) of three photocells is identified as monitoring the subject area for the subsequent reading of ambient intensity level. Unlike the prior art systems which pre-designate the center of the scene area as being the subject area for their comparative analysis of the distribution of scene illumination, the exposure control system embodying the present invention makes that selection automatically based on the results of the ranging operation.

When the system classifies scene lighting conditions as being normal, the selected exposure parameter signal program sets the ambient exposure level in accordance with the subject area intensity signal and provides a fixed ratio of artificial illumination so that the overall exposure is predominantly by ambient light. When scene lighting conditions are classified as backlit, the system automatically increases the output of the artificial light source above the normal level so that overall exposure of the scene is predominantly by artificial illumination. For forelit conditions, the exposure parameter signal program is operative to set the ambient level of exposure in accordance with the subject area intensity and inhibit operation of the artificial source, or reduce its output below the normal level, so the overall exposure is predominantly by ambient illumination.

Also provided is a method for controlling exposure of a photosensitive recording medium including the steps of emitting and detecting a ranging signal to locate the position of the subject within one or more different portions of the scene area, measuring the ambient light intensity in each different portion, comparing the light level of the subject area portion with non-subject area portions, and as a result of the comparison, classifying scene lighting conditions as normal, backlit or forelit, and selecting exposure parameters appropriate for the indicated lighting conditions.

BRIEF DESCRIPTION OF THE DRAWINGS

For a fuller understanding of the nature and objects of the invention, reference should be made to the following detailed description taken in connection with the accompanying drawings wherein.

DESCRIPTION OF THE PREFERRED EMBODIMENT

Figure 4:
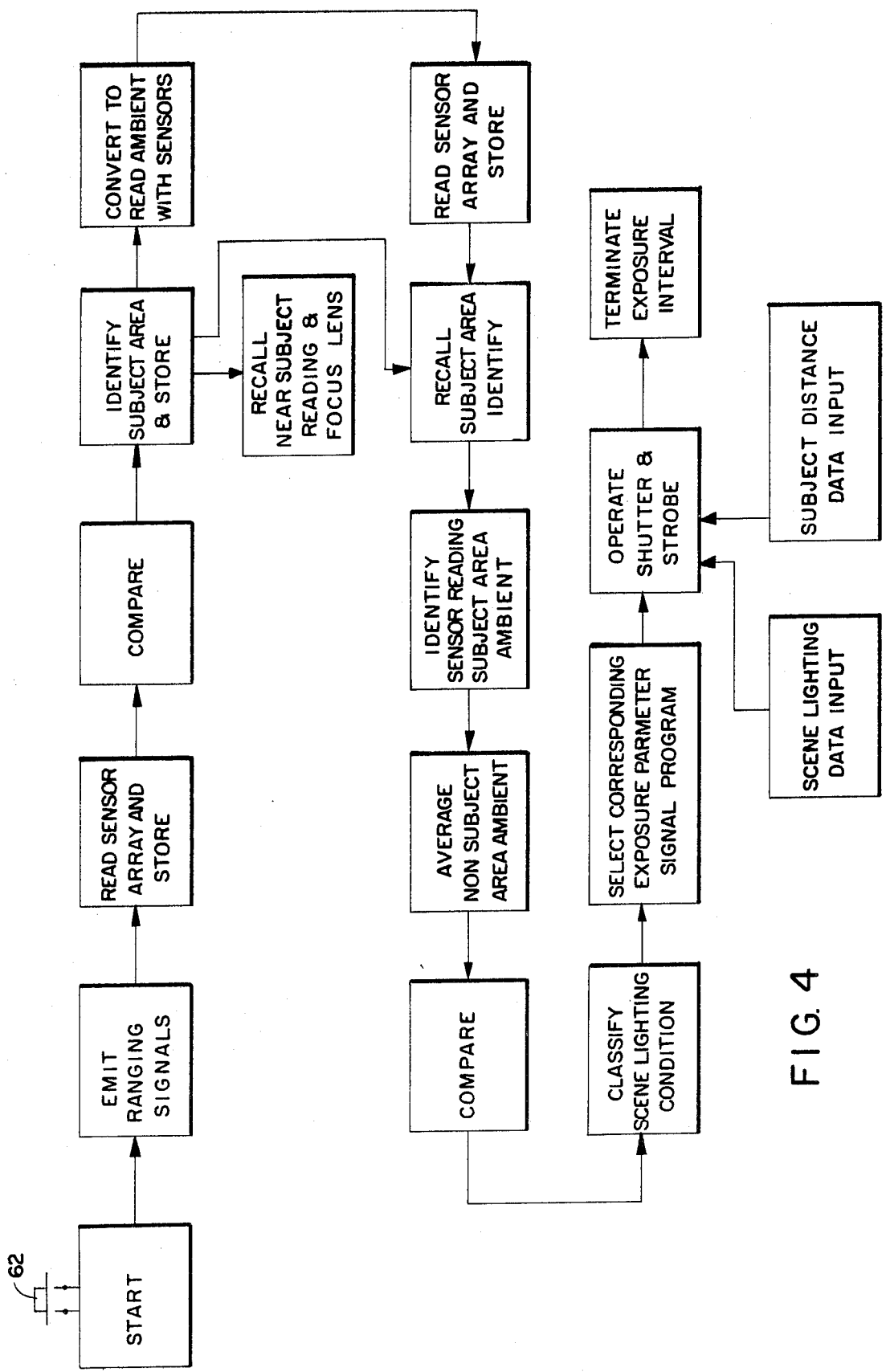
FIG. 4 is a functional block diagram of the exposure control system embodying the present invention.

The present invention provides a photographic exposure control system 10, shown in functional block form in FIG. 4, for initially classifying ambient scene lighting conditions as normal, backlit or forelit and, thereafter automatically selecting appropriate exposure parameters for the indicated conditions.

Figure 1:
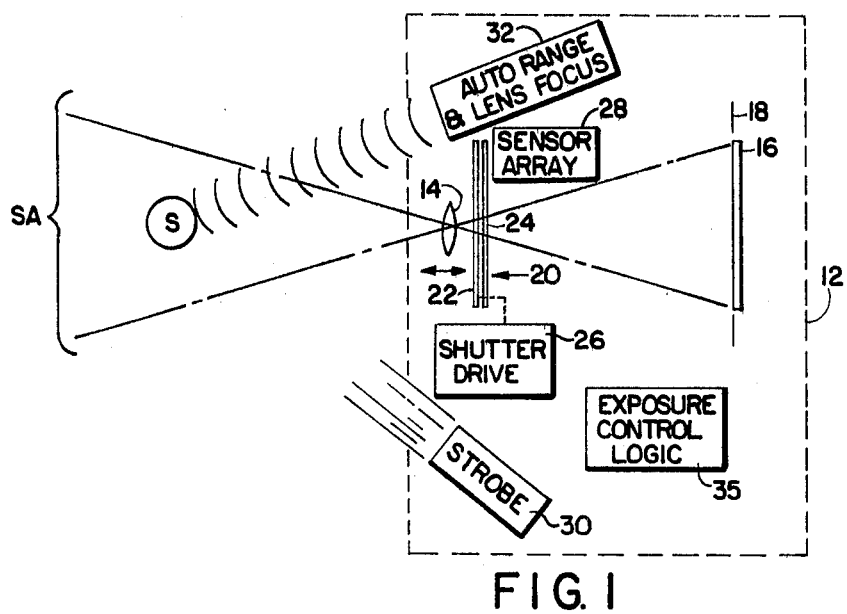
FIG. 1 is a schematic diagram, partly in block form, of a camera incorporating an exposure control system embodying the present invention.

System 10 is configured to be incorporated in photographic apparatus such as the camera 12 schematically shown in FIG. 1. Camera 12 includes an adjustable focus objective lens 14 for directing a focused image of a subject of principal interest S within the bounds of a scene area SA onto a photosensitive recording medium 16, such as a conventional or self-developing film unit, supported at the camera's film plane 18.

Means for controlling transmission of scene light passing through lens 14 to the film plane 18 include a dynamic aperture shutter arrangement 20 comprising a pair of overlapping shutter blades 22 and 24, each having an exposure aperture therein, that are adapted to be counter-reciprocally driven by a shutter drive system 26 between a first position wherein the exposure apertures are out of registration so that the blades block transmission of scene light to the film plane and a second position where the apertures are in registration to define a maximum exposure aperture. Movement of the blades 22 and 24 between the first and second positions causes the exposing apertures to progressively overlap so as to vary the effective aperture area as a function of blade displacement. Thus, the shutter arrangement 20 serves to control both the effective aperture area at which the exposure is made and the exposure interval. Representative examples of shutter arrangement 20 and drive system 26 suitable for incorporation into exposure control system 10 may be found in commonly assigned U.S. Pat. Nos. 4,297,016; 4,307,952; 4,315,675; and 4,325,614 all of which are incorporated by reference herein.

Other components of exposure control system 10 shown in FIG. 1 include a multi-sensor array 28, a variable output source of artificial illumination such as the illustrated quenchable strobe unit 30, an automatic ranging system 32 which optionally may be configured to automatically adjust the position of lens 14 to provide a focused image of the subject at the indicated range, and an exposure control logic system 35 for coordinating operation of various components of system 10.

In order to classify the ambient scene lighting conditions as normal, backlit, or forelit, the first step is to pin down the location of the subject of principal interest within the scene area. The next step is to separately measure the ambient light intensity in the subject area and surrounding non-subject areas. The scene lighting conditions then can be determined by comparing the illumination level of the subject area with the illumination of surrounding non-subject areas.

The first step in the classification process is carried out during a pre-exposure interval wherein ranging signals are emitted from system 32 towards the scene and reflected back portions of the ranging signals from each of different portions of the scene area are separately measured by a corresponding one of a plurality of sensors in array 28.

Figure 2:
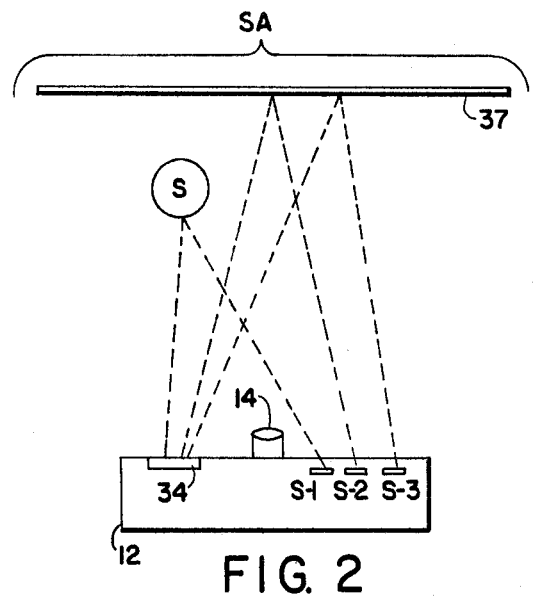
FIG. 2 is a schematic representation of the camera showing means for emitting ranging signals toward a scene having a subject of principle interest therein and an array of three sensors, each covering a different portion of the scene area, for receiving reflected back portions of the ranging signals.

In FIG. 2 a schematically represented camera 12 includes a range signal transmitter 34 for emitting ranging signals towards the scene area SA, and three sensors, S1, S2 and S3, forming part of array 28 for detecting reflected back portions of the ranging signals from corresponding selected different portions of the scene area covered by each of the sensors. The scene area SA is defined as the overall portion or area within the field of view of objective lens 14 that is ultimately imaged at the film plane so that the image fills the full frame or image area of the film unit 16.

Figure 3:
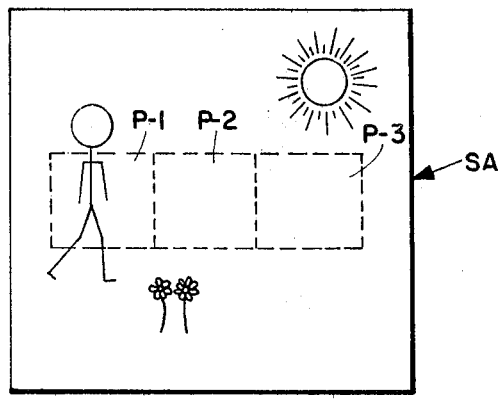
FIG. 3 is a schematic representation of a typical scene image projected on the film by the camera's optical system and having superposed thereon different selected dotted areas representative of the field coverage of each of the three sensors.

FIG. 3 is a schematic representation of a typical scene area SA showing superposed thereon, by dotted rectangles, the boundaries of three different scene area portions, P1, P2 and P3 that are monitored, respectively, by the corresponding sensors S1, S2 and S3. The selected portions P1, P2 and P3 cover approximately the middle third of the total scene area and divide that zone into three adjacent portions with area P2 in the center and areas P1 and P3 on opposite lateral sides thereof. In practice, the portions P1, P2 and P3 may overlap slightly with their next adjacent neighbor without significantly detracting from the overall performance of system 10.

Coverage is restricted to the middle one-third portion of the scene area under the assumption that it is most probable that the subject of principal interest will fall within this zone in most photographs. It is further assumed that objects or subjects in the bottom foreground and high upper background will most probably be of lesser interest that objects or subjects in the central zone of coverage.

In the illustrated embodiment range signal transmitter 34 emits ranging signals in the form of a burst of energy in the infrared portion of the spectrum or a combination of both visible and infrared radiation. The range signals impinge upon subjects or objects within the scene area and are reflected back therefrom towards camera 12 where they impinge upon the sensors S1, S2 and S3 which may be three silicon photo diodes responsive to both visible and infrared radiation and having infrared filters selectively positioned in front thereof during ranging operations to provide an output signal indicative of the intensity of the reflected back infrared component of the ranging signal. The intensity of the reflected back infrared portion is indicative of the distance to the object from which the infrared radiation was reflected back to the camera.

In FIG. 2 the subject of principal interest S is at the left side of the scene area, in scene area portion P1, and reflects back a rather high portion of the infrared ranging signal to the corresponding sensor S1. Infrared ranging signals in the center portion P2 and the right hand portion P3 are reflected back from some background object, such as a wall 37, to corresponding sensors S2 and S3. Since the wall is behind the subject S, the total length of the paths from the transmitter 34 to the wall 37 and then back to sensors S2 and S3 is longer than the corresponding path to the subject S and back to S1 so that the signals provided by sensors S2 and S3 will be of correspondingly lower intensity because signal strength diminishes in proportion to the square of the distance travelled.

In this manner, the relative strengths of the signals provided by S1, S2 and S3 are indicative of the camera to subject distance of subjects or objects in each of the three different scene area portions P1, P2 and P3.

Exposure control system 10 is configured to function on the assumption that the nearest subject to the camera is the subject of principal interest. In FIG. 2 the subject S is closer to the camera than the background wall 37 in areas P2 and P3. Upon comparison of the relative strengths of the signals provided by sensors S1, S2 and S3 it is de-termined that the closest subject lies within the scene area portion P1 which is identified as the subject area. Correspondingly, scene area portions P2 and P3 are now designated as non-subject areas.

The next step in the classification process is to measure the ambient brightness or illuminance level in each of the three corresponding scene area portions P1, P2 and P3.

Since we now know which of these three portions is designated as the subject area, the three separate brightness readings may be compared to determine the ratio of the subject area illumination level to the levels of the non-subject areas or the averaged levels of the non-subject areas. If the ambient brightness level of scene area portion P1 is about the same or close to the average of the brightness levels in the adjacent background areas P2 and P3 then scene lighting conditions can be classified as normal. However, if the average brightness level of the non-subject areas is much higher than the subject area P1 one must conclude that the scene is backlit. Conversely, if the subject area brightness level is much higher than the non-subject area brightness level then scene lighting conditions are classified as forelit.

One type of infrared ranging system that may be adapted for use in exposure control system 10 is disclosed and claimed in copending application U.S. Ser. No. 193,891 filed on Oct. 6, 1980 by Bruck K. Johnson and George D. Whiteside and entitled "Method and Apparatus Using Weighted Range Signal for Controlling Photographic Functions."

In adapting the above noted ranging system to exposure control system 10 the electronic strobe unit 30 also serves as the ranging signal transmitter 34 schematically shown in FIG. 2. Light emitted from electronic strobe units and flash lamps have components in both the visible and infrared frequency ranges. The sensors S1, S2 and S3 may be silicon photo-diodes which respond to radiation in both the visible and infrared portions of the spectrum. During the pre-exposure ranging interval the strobe unit 30 is triggered to emit a short pulse or wink of light towards the scene area. This light is reflected from objects in the scene area back towards the three sensors. By arranging suitable filters in front of the sensors which block visible light but transmit IR radiation, the sensors in effect monitor the reflected back portions of the infrared radiation. As is well-known in the photographic art, infrared radiation is reflected in a much more uniform manner by different colored objects than is visible radiation so that the reflected back intensity of the infrared component provides a better indication of camera to subject distance. After the ranging operation the same silicon photocells are used to measure the brightness level of ambient light reflected from the scene by arranging the filtration so that visible light is transmitted to the sensors while IR is blocked therefrom.

Figure 5:
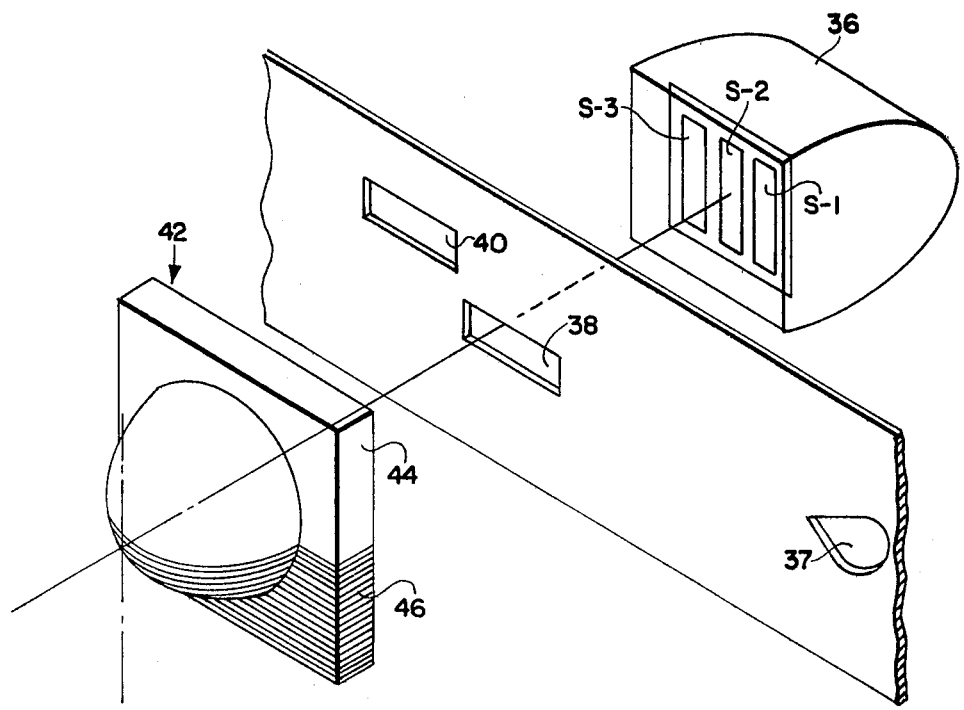
FIG. 5 is a schematic representation of an arrangement for selectively directing reflected back portions of the ranging signals and ambient light reflected from the scene to the three sensors.

One arrangement for selectively transmitting infrared and visible light to the three sensors is shown in FIG. 5. The three photocells, S1, S2 and S3 of array 28 are arranged in side by side relation in the front wall of a photocell housing 36 position behind one end of the shutter blades 22 and 24. While only the rear blade 24 is shown in FIG. 5 for visual clarity, each blade will include, in addition to an exposure aperture 37, a corresponding wink light aperture 38 and an ambient light aperture 40 displaced longitudinally and vertically relative to one another in order to sequentially register with the photocell array 28 in response to displacement of the shutter blades. Positioned in front of the shutter blades in optical alignment with the photocell array 28 is a molded plastic lens 42 configured to optically direct the appropriate portions P1, P2 and P3 of the scene area to the corresponding ones of the photocell sensors S1, S2 and S3. The lens assembly is divided into an upper portion 44 which is filtered, such as by thin film coating, to transmit visible light and block infrared radiation and a bottom portion 46 which is filtered by an appropriate coating to transmit infrared radiation and block visible light.

During the pre-exposure interval, with the blades 22 and 24 at rest in the light blocking position, the lowermost wink aperture 38 is in registration with the photocell array and the lower portion 46 of the lens assembly so that IR radiation passes therethrough to the photocell array while visible light passing through the upper lens portion 44 is blocked by the blade structure above aperture 38. In preparation for the ambient light reading, the blade assembly is displaced (to the right as viewed in FIG. 5) to move aperture 38 out of registration with the photocell array and move the upper ambient aperture 40 into registration therewith and the upper portion 44 of the lens assembly 42 to allow transmission of visible light through aperture 40 to the photocell array 28.

For more detailed description of components that are common to exposure control system 10 and the above described IR ranging system, reference may be had to the previously noted copending application U.S. Ser. No. 193,891 which is incorporated by reference herein.

In an alternative embodiment, the ranging signal transmitter 34 may be a separate source of infrared radiation such as an LED (light emitting diode) that is suitably filtered to confine its output to the infrared frequency range. In this embodiment the strobe unit 30 does not operate in the pre-exposure wink mode and its function is limited to providing supplementary illumination for film exposure.

Alternatively, the range signal transmitter 34 could be a sonic transducer that emits ranging signals in the ultrasonic frequency range and the sensors S1, S2 and S3 could be acoustic transducers for receiving such ultrasonic signals and providing an electrical output indicative of the relative strength of the detected ultrasonic signals as a measurement of camera to subject distance. However, such transducers are relatively large when compared to the size of silicon photodiodes, and their use may necessitate providing a camera having overall dimensions that are too large to be acceptable.

Those skilled in the art will appecreciate that the successful operation of exposure control system 10 requires the acquisition and processing of a relatively large amount of data within the relatively short time frame compatible with the film exposure process. To fulfill this requirement exposure control system 10 employs high speed digital logic circuits preferably including an integrated circuit microcomputer.

Figure 6:
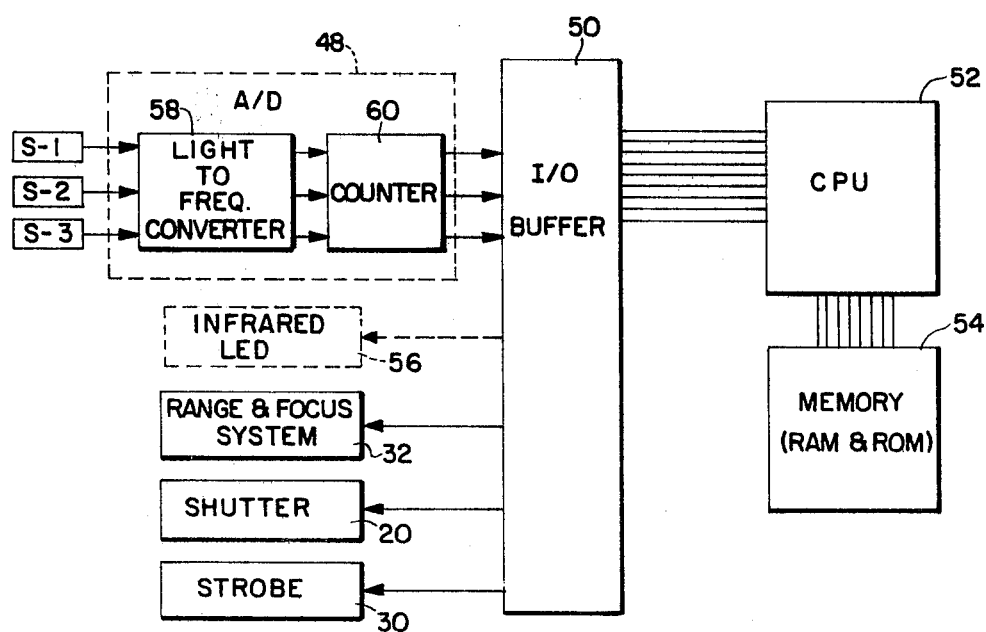
FIG. 6 is a schematic diagram showing certain of the major electrical components of the exposure control system.

A schematic representation of such a system is shown in FIG. 6. Ranging signal and ambient light measurement inputs from sensors S1, S2 and S3 are changed from analog to digital form by any suitable analog to digital converter 48 and are fed through an input/output device 50, such as the illustrated I/O buffer to the central processing unit 52 of a micro computer. The central processing unit 52 is also connected to a memory device 54 incorporating therein both ROM and RAM memory systems. The ROM section is preprogrammed with control instructions and different exposure perameter signal programs for normal, backlit and forelit modes of operation. The RAM memory is utilized for holding of acquired data and general computation tasks under the control of CPU 52 during the course of an operating cycle. Computed outputs from CPU 52 are fed through the I/O buffer 50 to control operation of the shutter arrangement 20, the strobe unit 30, the ranging and focusing system 32, and an infrared light emitting diode 56, shown in dotted lines, if this alternate approach is used instead of winking strobe unit 30 to provide the ranging signal.

In the illustrated embodiment, the analog to digital converter 48 comprises a three channel light frequency converter 58 for receiving signals from the sensors S1, S2 and S3 and converting their analog output to corresponding pulse trains having a frequency that is proportional to the intensity of the signals provided by each of the sensors, and a counter 60 for counting the pulse repetition rate to provide a digital number representation of the frequencies to the CPU 52 through buffer 50. Those skilled in the art will appreciate there are many other ways to convert the analog signals from sensors S1, S2 and S3 to a useful digital form and such alternative methods may be employed in exposure control system 10 if desired.

In operation, exposure control system 10 functions in the manner outlined in the block diagram of FIG. 4. The automatic cycle of operation is started in response to the camera operator actuating a cycle start button 62 mounted on the camera. This provides an input instructing the microcomputer to start the pre-exposure ranging cycle. The first event in the ranging cycle is the emission of ranging signals towards the scene area SA. This may be done by operating the strobe unit 30 in the wink mode or sending out a pulse of infrared radiation from a separate LED if that alternative embodiment is used. In either event, the shutter blades 22 and 24 are closed and initially positioned so that the wink aperture 38 is in registration with the photocell array 28 and the infrared transmitting lower portion 46 of lens 42.

Portions of the infrared ranging signal reflected back from subjects in the selected portions P1, P2 and P3 impinge upon the corresponding monitoring photocells S1, S2 and S3 thereby providing output signals that are proportional to the intensity of the reflected back portions of the signal. As noted earlier the intensity of these reflected back signals is indicative of camera to subject distance of subjects in each of the scene area portions. The signals from the sensors are converted from analog to digital form and are fed into the microcomputer through I/O buffer 50 where the readings are stored in memory. The absolute value of each of the three sensor readings provides an indication as to subject distance within each of the three selected portions of the scene area. Depending upon the sensitivity of the system, the distance readings may be directly in feet from the camera or, if the system is less sensitive, may be indicative of depth zones in which subjects are located. Next, the computer compares the three distance measurements to find the nearest subject to the camera and provides coded signal that identifies the sensor providing the near subject reading to thereby designate the corresponding portion of the scene area as the subject area. The subject area identifying signal is stored in memory for later recall.

If the exposure control system includes an automatic lens focusing capability, the distance information corresponding to the near subject area is used to move the lens 14 to the appropriate focus position. Also, range information may be used to set the output level of strobe 30 for film exposure purposes. The lens is focused either to a either to a specific distance, if the ranging system is of sufficient accuracy to provide such information, or is focused to provide an infocus image in a particular zone when the system is equipped with a zone focusing optical system. This concludes the ranging and focusing portion of the cycle. A detailed description of the lens focusing and flash setting aspects of the cycle may be found in commonly assigned U.S. Pat. Nos. 4,188,103 and 4,291,965 which are incorporated by reference herein.

Next, the system is converted from its ranging mode to its scene brightness evaluating mode to provide an indication of the ambient brightness level in each of the three scene area portions P1, P2 and P3. In the illustrated embodiment, this conversion takes place by operating the shutter arrangement 20, either during the pre-exposure interval or the initial portion of the exposure interval, to displace the blades such that the wink aperture 38 is moved out of the registered position and the ambient aperture 40 is moved thereinto to allow transmission of the visible portion of ambient light reflected from the scene area to pass through the upper portion 44 of lens 42 and impinge upon the photocell array 28. The ambient brightness level in each of the three scene area portions P1, P2 and P3 is read and stored in the computer memory.

After having acquired data on the intensity of the ambient illumination in each of the scene portions P1, P2, P3, the three intensity readings are now classified as being from the subject area or a non-subject area. This classification is done by recalling the signal identifying the subject area acquired earlier during the ranging mode from memory and using it to identify which of the three sensors S1, S2 or S3 is the one that is reading the light intensity of the subject area.

Having classified the ambient light intensity readings in this manner the two non-subject area readings preferably are averaged. It is of course possible that the subject of principal interest will cover more than one of the three selected portions of the scene area that are monitored by the sensors. In this case the subject area may cover two or even three of the zones. If the subject covers two zones then there is only one non-subject zone and there is no need to carry out the averaging process. Likewise if the subject covers three zones, by definition there is no non-subject area for the purpose of classifying scene lighting conditions.

We will assume for the moment that the ranging measurements indicate that there is a subject area and a non-subject area. In response to this indication the computer is pre-programmed to compare the intensity of the illumination in the subject area with the intensity in the non-subject area.

If the ambient brightness of the subject and non-subject areas is fairly close, indicating that there is a fairly well-balanced distribution of illumination levels within the total scene area, the system will provide a signal classifying scene lighting conditions as normal. If the subject area is much brighter than the non-subject area average, scene lighting conditions are classified as forelit. Conversely, if the average non-subject area reading is much higher than the subject area reading then scene lighting conditions are classified as backlit.

The microcomputer is pre-programmed to have stored therein three different programs of exposure parameter signals that control general operating strategy for the shutter and strobe unit during the film exposure interval.

The exposure parameter signal program for normal scene lighting conditions is configured to control the ambient contribution to total exposure by operating the shutter in a manner determined by the ambient light reading in the subject area. In this case it is preferable for the ambient light contribution to exposure to be approximately 75% with the remaining 25% being provided by the strobe unit 30 operating in a fill-flash mode to reduce the effects of shadows cast on subject of principal interest.

The exposure parameter signal program for backlit scenes sets the ambient exposure in accordance with the averaged reading from the non-subject areas and increases the strobe output (to a level that is greater than the normal lighting output) to contribute perhaps 75% of the total exposure thereby ensuring that the subject of principal interest is well-illuminated.

For forelit scenes, the exposure parameter signal program determines the ambient exposure in accordance with the subject area reading and may eliminate the flashing of the strobe altogether or reduce it to a low level, below the normal lighting output.

Once the scene lighting conditions have been classified the computer automatically selects the corresponding exposure parameter signal program from memory and feeds it to a control circuit for operating the shutter and strobe unit in a coordinated manner to follow the selected exposure strategy.

During the exposure interval, the sensor array 28 may be once again employed to provide a measurement of scene lighting conditions which serves as a feedback to the control circuitry to determine when to quench the strobe unit and provide a signal for closing the shutter to terminate the exposure interval. Alternatively, the ambient light readings made to classify scene lighting conditions that are in storage may be recalled at this point to provide a scene lighting input into the circuit controlling of the shutter and strobe unit to obtain correct film exposure. Also, the stored camera to subject distance measurement may be recalled to serve as an input for determining the output level of the strobe unit. Although the illustrated system 10 employs a variable output strobe unit 30, it is within the scope of the present invention to substitute a fixed output strobe or flash lamp thereof. In this case the contribution to total exposure of the artificial light source may be changed by selectively varying the flash fire point along the aperture area versus time trajectory curved defined by the shutter over the course of the exposure interval. For representative examples of methods that may be incorporated into system 10 for varying the ambient to flash contribution ratio see commonly assigned U.S. Pat. Nos. 4,255,030; and 4,315,676.

Those skilled in the art of photographic exposure control systems will appreciate that the range and brightness data acquired and stored for each of the different scene area portions, along with the derived scene lighting condition classification may be used in any number of ways to develoop film exposure strategies that are different than those outlined above without departing from the spirit of the invention disclosed herein. For example, the ambient intensity measurements may be used to additionally classify scene lighting conditions as low, medium or high and the shutter operation may be adjusted accordingly to emphasize depth of field or exposure interval while still maintaining the appropriate mix of ambient and artificial light contribution to exposure.

In the illustrated embodiment, system 10 monitors only three scene area portions P1, P2 and P3 in the middle of the scene during ranging and ambient light intensity measurements. However, it is within the scope of the present invention to provide such a system which monitors a greater number of portions by providing additional sensors in array 28 and a lens system for focusing additional scene area portions on the corresponding sensors. Also, the monitored portions may be larger or smaller than illustrated and/or disposed in other arrangements including spaced apart portions or overlapping portions.

While the illustrated embodiment utilizes a microcomputer to control data manipulation and operation of system components, those skilled in the art will appreciate it may be replaced with a plurality of dedicated logic circuits which collectively perform the essential functions of the microcomputer.

An alternative method of classifying ambient scene lighting conditions may be carried out with system 10 by measuring the ambient infrared content of light reflected from the scene following the ranging measurements. This is feasible because the ambient infrared intensity distribution is closely correlated to the visible light intensity distribution. In such an embodiment the shutter would not have to be moved during the lighting condition classification mode because the same infrared aperture 38 could be used to transmit the infrared content of the wink ranging signal and then the ambient infrared content.

Those skilled in the art will appreciate that a major advantage of system 10 is that it automatically operates as a variable spot metering system for accurately determining the proper mix of ambient and flash contribution to exposure by first identifying the subject area portion of the scene and then comparing light values in different scene portions based on the intial subject area identification.

Although the illustrated embodiment of system 10 emits a ranging signal and detects reflected back portions thereof to determine subject distances, it is within the scope of the present invention to substitute a passive ranging system that does not emit ranging signal but rather is based on optical image triangulation techniques that are well known in the art. Also, system 10 is intended to classify ambient scene lighting conditions as being one of a plurality of different predetermined lighting conditions. In the illustrated embodiment system 10 classifies conditions as being one of three (normal, backlit or forelit). However, it should be understood that it is within the scope of the present inventions to provide a system 10 that classifies conditions as either normal or backlit; or normal or forelit. Also system 10 can be configured to provide more than these classifications or to break the illustrated classes down into subclasses.

Because various changes and modifications may be made in exposure control system 10 and the exposure methods described without departing from the spirit and scope of the invention involved herein, it is intended that all matter contained in the above description or shown in the accompanying drawings shall be interpreted as being illustrative and not in a limiting sense.

I claim:

1. A photographic exposure control system for classifying ambient scene lighting conditions as normal, backlit or forelit and, thereafter, automatically selecting appropriate exposure parameters for the indicated conditions, said system comprising:
means, including a shutter arrangement, responsive to exposure parameter signals for controlling transmission of image forming light from a scene area to a photosensitive recording medium during an exposure interval;
means, operative during a pre-exposure interval, for emitting ranging signals toward the scene area, separately measuring reflected back portions of the said ranging signals from each of a plurality of selected different scene area portions to determine the distance range of subjects therein, comparing said range measurements, and providing a signal identifying the scene area portion having the nearest subject therein to designate said portion as the subject area;
means, operative during said pre-exposure interval or during an initial portion of the exposure interval, for separately measuring the ambient light intensity in each of the selected different scene area portions and providing corresponding separate light intensity signals for each said portion;
means responsive to said subject area identifying signal and said light intensity signals for comparing the subject area light intensity with the light intensity of non-subject areas and, as a result of the comparison, providing a signal classifying ambient scene lighting conditions as normal, backlit or forelit;
means for storing normal, backlit and forelit exposure parameter signal programs; and
means responsive to said classifying signal for selecting the appropriate one of said programs corresponding to said classifying signal and transmitting said selected program of signals to said means for controlling transmission of image forming scene light to said recording medium.

2. The system of claim 1 further including a source of artificial illumination responsive to flash operating signals in said exposure parameter signal programs for emitting supplementary artificial light towards the scene area during an exposure interval and said predetermined exposure parameter signal programs are configured to control operation of said shutter arrangement and source of artificial illumination in a manner to provide a different ratio of ambient to artificial light contribution to exposure for each of said normal, backlit and forelit programs.

3. The system of claim 2 wherein said normal program provides a selected ambient to artificial light ratio, said backlit program provides a ratio having a greater artificial light content than said normal program ratio, and said forelit program provides a ratio having a lesser artificial light content than said normal program ratio.

4. The system of claim 3 wherein operation of said shutter arrangement is controlled in accordance with selected ones of said ambient light intensity measurements to set the ambient light contribution to exposure, said normal program sets the ambient light contribution in accordance with said subject area light intensity and provides a selected ratio of ambient to artificial light so that overall exposure of the subject is predominantly by ambient light, said backlit program sets the ambient light contribution in accordance with non-subject area light intensity and increases the artificial light contribution above the normal level so that overall exposure of the subject is predominantly by artificial illumination, and said forelit program sets the ambient light contribution in accordance with subject area light intensity and reduces the artificial light contribution below the normal level so that overall exposure of the subject is predominantly by ambient light providing a greater contribution than the normal program level.

5. The system of claim 4 wherein said backlit non-subject area intensity is an average of all non-subject area intensities.

6. The system of claim 4 wherein said forelit program inhibits operation of said artificial light source and overall exposure of the subject is entirely by ambient illumination.

7. The system of claim 1 wherein said means for measuring reflected back portions of said ranging signals and said means for measuring ambient light intensity each include a common set of sensors.

8. The system of claim 7 wherein said means for emitting ranging signals emits signals including an infrared radiation component and said common sensor include a plurality of photodetectors sensitive to both infrared radiation and visible light.

9. The system of claim 1 wherein said different scene area portions are adjacent one another.

10. The system of claim 9 wherein said adjacent portions extend in a row across a middle portion of the scene area.

11. The system of claim 10 wherein said different portions include at least a center portion and adjacent side portions on opposite sides of said center portion.

12. The system of claim 1 further including a variable focus lens for providing an image of the scene area, means responsive to a range measurement signal for varying the focus of said lens to focus an image at the indicated range and means for providing the range measurement of the subject area to said lens focusing means to effect focusing said lens on the subject.

13. A method of classifying ambient scene area lighting conditions as normal, backlit or forelit for photographic purposes, said method comprising the steps of:
emitting ranging signals towards the scene area;
separately measuring reflected back portions of said ranging signals from each of a plurality of selected different scene area portions to determine the distance range of subjects therein;
comparing said range measurements to determine which scene area portion has the nearest subject therein;
providing a signal identifying the portion having the nearest subject therein to designate that portion as the subject area;
separately measuring the ambient light intensity in each of said different scene area portions;

utilizing said identifying signal to determine which of said light intensity measurements corresponds to said subject area;
comparing said subject area light intensity measurements with a non-subject area light intensity measurement; and
providing a signal classifying lighting conditions as normal when the ratio of subject area to non-subject area light intensity is within a predetermined normal range, providing a signal classifying conditions as backlit when the ratio falls within a range that is lower than said normal range, and providing a signal classifying conditions as forelit when the ratio falls within a range that is higher than said normal range.

14. The method of claim 13 wherein the ranging signals include radiation in the infrared frequency range.

15. The method of claim 14 wherein the ranging signal includes visible light and radiation in the infrared frequency range and the step of separatley measuring the reflected back portions of said ranging signal includes measuring only the infrared component of said signals.

16. The method of claim 15 utilizing a strobe unit to emit said ranging signals.

17. The method of claim 13 wherein said selected different scene area portions are adjacent one another and include a center portion and side portions on opposite sides of said center portion.

18. The method of claim 17 wherein said adjacent portions are selected to extend over a middle portion of the scene area.

19. The method of classifying ambient lighting conditions in a scene area as normal, backlit, or forelit and thereafter selecting appropriate exposure parameters for the indicated conditions utilizing a photographic exposure control system comprising means, including a shutter arrangement, responsive to exposure parameter signals for controlling transmission of image forming light from a scene area to a photosensitive film recording medium during an exposure interval and means for storing normal, backlit and forelit exposure parameter signal programs, said method comprising the steps of:
emitting ranging signals towards the scene area;
separately measuring reflected back portions of said ranging signals from each of a plurality of selected different scene area portions to determine the distance range of subjects therein;
comparing said range measurements to determine which scene area portion has the nearest subject therein;
providing a signal identifying the portion having the nearest subject therein to designate that portion as the subject area;
separately measuring the ambient light intensity in each of said different scene area portions;
utilizing said identifying signal to determine which of said light intensity measurements corresponds to said subject area;
comparing said subject area light intensity measurement with a non-subject area light intensity measurement;
providing a signal classifying lighting conditions as normal when the ratio of subject area to non-subject area light intensity is within a predetermined normal range, providing a signal classifying conditions as backlit when the ratio falls within a range that is lower than said normal range, and providing a signal classifying conditions as forelit when the ratio falls within a range higher than said normal range;
selecting the corresponding one of the normal, backlit and forelit exposure parameter signal programs in accordance with the classifying signal provided; and
transmitting the selected program to said means for controlling transmission of image forming light to said recording medium.

20. The method of claim 19 wherein the exposure control system further includes a source of artificial illumination for directing artificial light towards the scene area to supplement the ambient light for exposure purposes and said method further includes the step of appropriately varying the ratio of ambient to artificial light contribution to exposure for each of the different indicated scene lighting conditions.

21. The method of claim 20 including the step of controlling operation of the shutter arrangement in accordance with selected ones of said of the ambient light intensity measurements to set the ambient light contribution to exposure.

22. The method of claim 21 including the step of setting the ambient light contribution in accordance with the subject area light intensity for normal conditions and providing a selected ratio of ambient to artificial light so that normal overall exposure of the subject is predominantly by ambient light, for backlit conditions setting the ambient light contribution in accordance with non-subject area light intensity and increasing the artificial light contribution above the normal level so overall exposure of the subject is predominantly by artificial illumination, and for forelit conditions setting the ambient light contribution in accordance with the subject area intensity and reducing the artificial light contribution so overall exposure is predominantly by ambient light providing a greater contribution than the normal ambient contribution.

23. The method of claim 19 including the step of utilizing the source of artificial illumination to provide the ranging signals.

24. The method of claim 19 including the step of utilizing infrared radiation for the ranging signals.

25. The method of claim 19 wherein said different scene area portions are adjacently disposed across a middle portion of said scene area.

26. A photographic exposure control system for classifying ambient scene lighting conditions as being one of a plurality of different predetermined lighting conditions and, thereafter, automatically selecting appropriate exposure parameters for the indicated conditions, said system comprising:
means, including a shutter arrangement, responsive to a selected exposure program for controlling transmission of image forming light from a scene area to a photosensitive recording medium during an exposure interval;
means, operative during a pre-exposure interval or during an initial portion of the exposure interval, for determining the distance range of subjects in each of a plurality of selected different scene area portions, comparing the distance ranges, and providing a signal identifying the scene area portion having the nearest subject of interest therein to designate said portion as the subject area of the scene;
means, operative during the pre-exposure interval or during an initial portion of the exposure interval, for separately measuring the ambient light intensity in each of the selected different scene area portions and providing corresponding separate light intensity signals for each said portion;

means responsive to said subject area identifying signal and said light intensity signals for comparing the subject area light intensity with the light intensity of non-subject area and, as a result of the comparison, providing a signal classifying ambient scene lighting conditions as a corresponding one of said plurality of different lighting conditions;

means for providing exposure programs for each of said plurality of different lighting conditions; and means responsive to said classifying signal for selecting the appropriate one of said exposure programs and for transmitting said selected program to said means for controlling transmission of image forming scene light to said recording medium in accordance therewith.

27. The system of claim 26 wherein ambient scene lighting conditions are classified, at least, as normal or backlit.

28. The system of claim 26 wherein ambient scene lighting conditions are classified, at least, as normal, backlit or forelit.

* * * * *